(12) United States Patent
Adams et al.

(10) Patent No.: US 9,619,525 B2
(45) Date of Patent: *Apr. 11, 2017

(54) METHOD AND SYSTEM OF OPTIMIZING A WEB PAGE FOR SEARCH ENGINES

(71) Applicant: gShift Labs Inc., Barrie (CA)

(72) Inventors: Chris Adams, Barrie (CA); Krista LaRiviere, Oro Station (CA); Jeff Jones, Barrie (CA)

(73) Assignee: gShift Labs Inc., Barrie (CA)

( * ) Notice: Subject to any disclaimer, the term of this patent is extended or adjusted under 35 U.S.C. 154(b) by 42 days.

This patent is subject to a terminal disclaimer.

(21) Appl. No.: 14/707,121

(22) Filed: May 8, 2015

(65) Prior Publication Data
US 2015/0254251 A1 Sep. 10, 2015

Related U.S. Application Data

(63) Continuation of application No. 13/014,147, filed on Jan. 26, 2011, now Pat. No. 9,058,242.
(Continued)

(51) Int. Cl.
*G06F 3/00* (2006.01)
*G06F 17/30* (2006.01)
(Continued)

(52) U.S. Cl.
CPC .......... *G06F 17/3053* (2013.01); *G06F 17/00* (2013.01); *G06F 17/30* (2013.01);
(Continued)

(58) Field of Classification Search
CPC ...... G06F 17/3053; G06F 17/00; G06F 17/30; G06F 17/30309; G06F 17/30353; G06F 17/30864; G06F 17/30882; G06F 17/30997
See application file for complete search history.

(56) References Cited

U.S. PATENT DOCUMENTS 6,654,741 B1 11/2003 Cohen et al.
7,539,776 B1 5/2009 Saare et al.
(Continued)

FOREIGN PATENT DOCUMENTS

| CN | CA102902780 A | 1/2013 |
|---|---|---|
| CN | 103823883 B | 6/2015 |
| WO | WO2013095755 A2 | 6/2013 |

OTHER PUBLICATIONS

Ledford et al. "Google Analytics, 3rd Edition," Published Dec. 9, 2009, pp. 245-387.
(Continued)

*Primary Examiner* — Kyle Stork
(74) *Attorney, Agent, or Firm* — Bereskin & Parr LLP/S.E.N.C.R.L., s.r.l.

(57) ABSTRACT

An organic search ranking of a web page for a particular search query can be optimized by publishing a large number of short, subsidiary web documents associated with the web page. The web page and the associated web documents can be individually optimized in terms of one or more parameters based upon web analytical data compiled for the search query. The web page and associated web documents can also be jointly optimized by coordinating the content of the associated web documents to align with the primary web page, and further by providing a network of links between the associated web documents and the primary web page. To provide greater insight and to assess the overall efficacy of the web presence optimization effort, historical search rank data can be correlated with specific events and reported to a user.

22 Claims, 5 Drawing Sheets

Related U.S. Application Data

(60) Provisional application No. 61/310,374, filed on Mar. 4, 2010.

(51) Int. Cl.
*G06F 17/00* (2006.01)
*G06Q 50/00* (2012.01)

(52) U.S. Cl.
CPC .. *G06F 17/30309* (2013.01); *G06F 17/30353* (2013.01); *G06F 17/30864* (2013.01); *G06F 17/30882* (2013.01); *G06F 17/30997* (2013.01); *G06Q 50/01* (2013.01)

(56) References Cited

U.S. PATENT DOCUMENTS

| | | |
|---|---|---|
| 2006/0277087 A1 | 12/2006 | Error |
| 2008/0091708 A1 | 4/2008 | Caldwell |
| 2009/0024069 A1 | 1/2009 | Appel |
| 2009/0207056 A1 | 8/2009 | Fornero |
| 2009/0240674 A1 | 9/2009 | Wilde et al. |
| 2009/0299998 A1 | 12/2009 | Kim |
| 2009/0307056 A1 | 12/2009 | Park et al. |
| 2010/0082610 A1 | 4/2010 | Anick et al. |
| 2010/0235339 A1 | 9/2010 | Anderson et al. |
| 2011/0113325 A1 | 5/2011 | Richardson et al. |
| 2011/0307515 A1 | 12/2011 | Chen et al. |
| 2013/0238435 A1 | 9/2013 | Barak et al. |
| 2015/0081419 A1 | 3/2015 | Strutton et al. |
| 2015/0081438 A1 | 3/2015 | Strutton et al. |
| 2015/0095487 A1 | 4/2015 | Kelly et al. |
| 2015/0161282 A1 | 6/2015 | Low et al. |

OTHER PUBLICATIONS

Trks.it—Beta. "How It Works trks. it Beta." Downloaded Sep. 8, 2015. Available: https://get.trks.it/howitworks/.
HubSpot, Inc. "How to create a tracking URL for a landing page" Downloaded Sep. 8, 2015. Available: http://knowledge.hubspot.com/landingpageuserguide/howtocreateatrackingurlforalandingpage.
Scalability Project. "Using link tracking with short urls to measure your offline marketing." Downloaded Aug. 9, 2015. Available: http://scalabilityproject.com/blog/using-link-tracking-short-urls-measure-offline-marketing/.

METHOD AND SYSTEM OF OPTIMIZING A WEB PAGE FOR SEARCH ENGINES

CROSS-REFERENCE TO RELATED APPLICATIONS

This application is a continuation of Ser. No. 13/014,147 filed Jan. 26, 2011 which claims the benefit of U.S. Provisional Patent Application No. 61/310,374, filed Mar. 4, 2010. The entirety of U.S. Provisional Patent Application No. 61/310,374 and U.S. patent application Ser. No. 13/014,147 are hereby incorporated by reference.

FIELD

The described embodiments relate to a method and computer system for optimizing a web page for search engines, and more particularly to optimizing an organic search ranking of the web page.

BACKGROUND

Internet search engines algorithmically search for web documents, such as web page, weblogs ("blogs"), social media posts, images, videos, and various other documents types that are uploaded to the Internet. Typically, a user enters a search query, which could be a particular word or phrase, and in response the search engine will generate and present a listing of web documents to the user, which have been identified by the search engine as bearing some connection or relevance to the entered search query. The various search results are ranked by the search engine according to relevance, and then displayed in a list in order of decreasing relevance. The most relevant documents are situated at the top of the search results. Less relevant documents follow in order. In some cases, a position at the top of the search results for a particular search query may be guaranteed by, essentially, purchasing that privilege from the proprietor of the search engine (referred to as a "sponsored search result"). Otherwise the search ranking of a given web page for a particular search query is determined according to the search algorithm executed by the search engine.

Internet search engines typically do not search the Internet directly. Instead the search engine will "crawl" the Internet ahead of time and index every web page it encounters according to content. To perform the indexing, the search engine extracts and analyzes content taken from different locations within the web page, for example keywords included in the titles, headings, and meta tags of the web page. The extracted web page data is stored (referred to as "caching") in the index database for later search queries in the search engine. Some search engines cache all or part of the source web page, as well as well as other potentially relevant information about the web page. Other search engines cache every word of every web page that is crawled. Accordingly, when the user enters the search query into the search engine, typically in the form of a keyword or keyword phase (though other more advanced search delimiters can be made available as well), the search engine will access the index database directly to generate a list of best-matching web pages for the particular search query.

How the search engine ranks web pages for a given search query is based on a proprietary algorithm executed in the search engine to quantify relevance. Given the sheer number of different web pages on the Internet that may include the same particular word or phrase, some web pages are bound to be more relevant, popular, useful, authoritative, etc., than other web pages. The search rank algorithm makes a reasoned determination of that relevance. In a sense, therefore, the effectiveness of the search engine depends on its ability to parse through the volume to generate relevant search results for the user. Different search engines can apply different ranking algorithms based upon different parameters and weighting factors, but almost all search engines withhold specific details about their proprietary ranking algorithm to safeguard its efficacy. Should the details of the algorithms become widely known, web pages could then be cultivated to maximize their rankings in the various ranking algorithms for a particular search query without regard to the actual relevance of the web pages. Most search engines also, for this reason, constantly update and make changes to their ranking algorithms. The algorithms also evolve over time in response to changes in Internet usage and other external factors as new web techniques emerge.

SUMMARY

According to one aspect, some embodiments of the invention provide a method of optimizing a web page for search engines. The method includes the steps of: compiling web analytical data; determining, using a processor, a recommended modification to at least one parameter of a web document associated with the web page, the recommended modification to improve an organic search ranking of the web page for a search query performed in one or more of the search engines, the determination made based upon the web analytical data; applying, in a user interface, the recommended modification to the at least one parameter of the associated web document; generating at least one data graph of historical search rank data including the organic search ranking of the web page for the search query over time; correlating, using the processor, event data with a feature or trend in the at least one data graph; and displaying, in the user interface, the at least one data graph annotated with the event data correlated with the feature or trend.

The associated web document can be each of a press release, a blog post, and a social media post.

The at least one parameter of the associated web document for which a modification is recommended can be each of title content, title length, keyword content, keyword location, document code structure, document format, document content, document headings, document tags, document meta content, blocker elements, web document indicator (ie URL), linking structures, and tracking codes.

The recommended modification can be to include at least one keyword or at least one keyword phrase in the associated web document. In some embodiments, the recommended modification can be to include the at least one keyword in the title of the associated web document, one or more data tags of the associated web document, one or more headings included in the associated web document, or one or more linking structures in the associated web document. The recommended modification can be to include the at least one selected keyword in multiple locations throughout the associated web document. The recommended modification can also be to include the at least one selected keyword in a specific position within the associated web document.

The recommended modification can be to restrict the title length of the associated web document to a specified character limit.

The recommended modification can be to incorporate at least one linking structure in the associated web document. In some embodiments, the at least one linking structure can provide a link from the associated web document to the web page, another location in the associated web document, other web documents associated with the web page, or other web documents having content similar to the web page.

The recommended modification can be to change the code structure of the associated web document or to remove one or more blocker elements from the associated web document.

The recommended modification can be to include or alter one or more data tags or document headings in the associated web document.

The recommended modification can be to generate a short URL for the associated web document.

The web analytical data can be distribution data for the associated web document, including each of a number or frequency of references to the associated web document in other web documents, a number or frequency of re-postings of the associated web document in other web documents, a number or frequency of click-throughs to the associated web document from other web documents, a number or frequency of backlink referrals, a number or frequency of social bookmarks of the associated web document, a number or frequency of social sharing mentions of the associated web document, and a number or frequency of sales conversions.

The web analytical data can be search rank data for the web page, including a present or historical search ranking for each of the search query of the web page, the associated web document, and other web documents associated with competitors of the web page.

The event data can include timing data for each of the applied modification to the at least one parameter of the associated web document, the publication of new web documents associated with the web page, social bookmarking of the associated web document, and social sharing mentions of the associated web document.

The event data can be timing data for an alteration to a respective search rank algorithm used in one or more of the search engines.

In some embodiments, the method includes the further steps of: determining, using the processor, a recommended modification to at least one parameter of the web page to improve the organic search ranking of the web page for the search query in one or more of the search engines; and applying, in the user interface, the recommended modification to the at least one parameter of the web page.

In some embodiments, the method includes the further steps of: determining, using the processor, a recommended release schedule for publishing new web documents associated with the web page, the determination made based upon the web analytical data; and publishing a number of the new web documents according to the recommended release schedule.

In some embodiments, the method includes the further steps of: determining, using the processor, a recommended distribution schedule for distributing links to published web documents associated with the web page to social media sites, the determination made based upon the web analytical data; and distributing the links to the published web documents according to the recommended distribution schedule.

In some embodiments, the user interface is presented as a plug-in for a web development application.

According to another aspect, some embodiments of the invention provide a system for optimizing a web page for search engines. The system includes a storage medium storing executable instructions and a processor coupled to the storage medium. The processor is programmed by the stored instructions to: compile web analytical data; determine a recommended modification to at least one parameter of a web document associated with the web page, the recommended modification to improve an organic search ranking of the web page for a search query performed in one or more of the search engines, the determination made based upon the web analytical data; prompt, in a user interface, to apply the recommended modification to the at least one parameter of the associated web document; generate at least one data graph of historical search rank data including the organic search ranking of the web page for the search query over time; correlate event data with a feature or trend in the at least one data graph; and display, in the user interface, the at least one data graph annotated with the event data correlated with the feature or trend.

According to yet another aspect, some embodiments of the invention provide a non-transitory, computer-readable storage medium storing instructions that are executable by a processor coupled to the storage medium. The stored instructions program the processor to: compile web analytical data; determine a recommended modification to at least one parameter of a web document associated with a web page, the recommended modification to improve an organic search ranking of the web page for a search query performed in one or more of the search engines, the determination made based upon the web analytical data; prompt, in a user interface, to apply the recommended modification to the at least one parameter of the associated web document; generate at least one data graph of historical search rank data including the organic search ranking of the web page for the search query over time; correlate event data with a feature or trend in the at least one data graph; and display, in the user interface, the at least one data graph annotated with the event data correlated with the feature or trend.

These and other features of the embodiments are set forth and described herein.

BRIEF DESCRIPTION OF THE DRAWINGS

A detailed description of various embodiments of the invention, including a preferred embodiment, is provided herein below with reference to the following drawings, in which.

Figure 1:
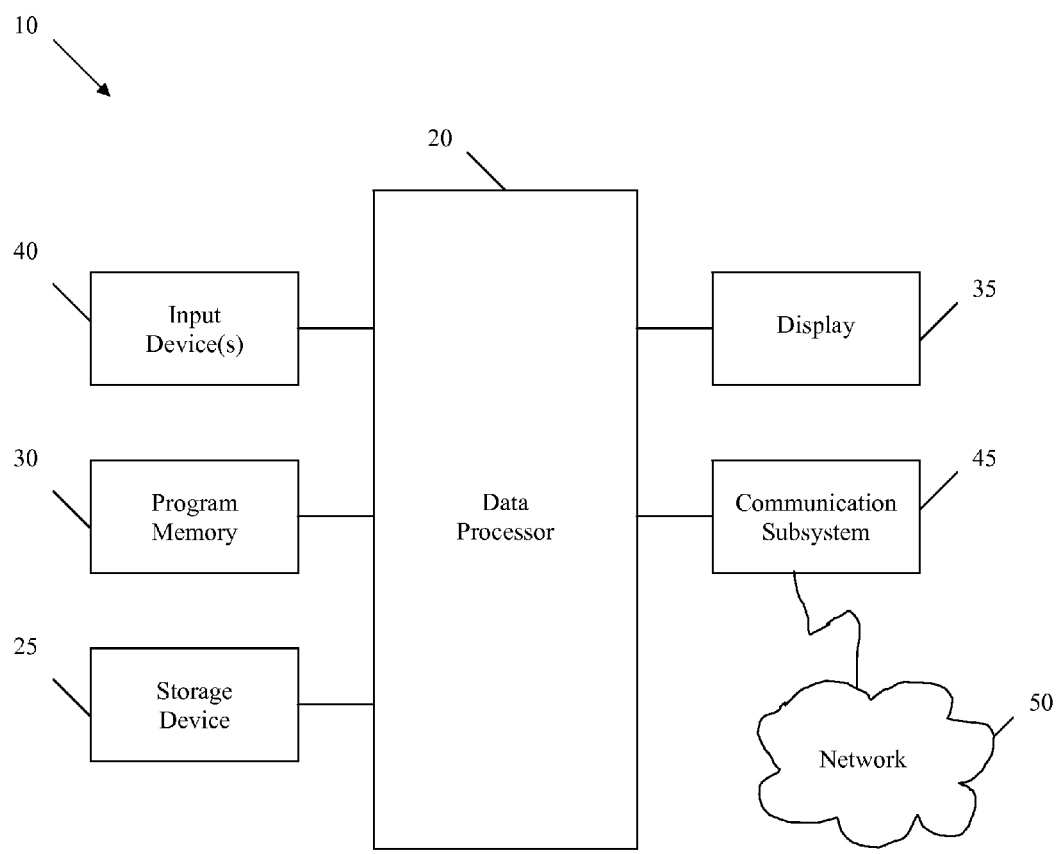
FIG. 1 is a schematic diagram illustrating the components of a computer system configured for optimizing a web page for search engines, according to aspects of embodiments of the present invention.

It will be understood that the drawings are exemplary only and that any reference to them is done for the purpose of illustration only, and is not intended to limit the scope of the embodiments described herein below in any way. For convenience, reference numerals may also be repeated (with or without an offset) throughout the figures to indicate analogous components or features.

DESCRIPTION OF EXEMPLARY
EMBODIMENTS

Search Engine Optimization ("SEO") refers to the web science of customizing web page content and format to increase the ranking of the web page in search engines for particular search queries. Some SEO approaches are considered to run contrary to Internet best practice and be generally deceitful. For example, stuffing a web page with keywords that do not actually relate to the content of the web page and in locations that do not naturally appear visible to the user is one favoured approach. Key words can be included in document meta tags, in document text that is for one reason or another invisible to the user, and elsewhere in the architecture of the web document that is not easily viewable to the user. Another favoured approach is to generate numerous incoming hyperlinks to the web page from other web documents that have little to no value. In a worst case, perhaps, these other web documents are nothing but "link farms" containing only a bare list of hyperlinks and existing almost exclusively just to elicit higher search rankings.

Increasingly there is a movement toward SEO initiatives that "organically" improve the search ranking of the web page. As compared to some of the favoured tactics described above, these other SEO initiatives are designed not only to improve the search ranking of a web page for a particular keyword or keyword phrase that is actually relevant to the web page, but to do so while maintaining the overall aesthetic quality of the web page and without substantially impairing its usability. In other words, the organic search ranking is achieved by embedding only keywords in the web page that bear a substantial relevance to the content of the web page and that are, to at least some extent, naturally incorporated into the document text and not simply stuffed into the architecture of the document out of the sight of the user. For organic search rankings, incoming hyperlinks to the webpage will also originate from relevant and legitimate web pages and not from link farms. Similarly outgoing links should point to relevant and legitimate documents for an organic search ranking.

In order to generate search rankings, Internet search engines more and more are also emphasizing the currency of web page content and the frequency at which new content is distributed to other web pages, in addition to more traditional factors such as keywords and incoming hyperlinks. One consequence of this shift in emphasis is that smaller, more frequently updated and widely shared web pages, in particular press releases, blogs, social media profiles, etc., are beginning to exhibit high (and sometimes higher) search rankings as compared to more traditional web pages, such corporate enterprise pages. This shifting trend also suggests that, in order to achieve high search rankings for more traditional web pages, increasingly it is becoming possible to take advantage of the perceived relevance that the search engines are placing on the newer, less traditional forms of web pages.

The embodiments described herein relate generally to a method and computer system for optimizing a web page for search engines. The described embodiments optimize the web page in terms of the above described traditional parameters, such as keywords and hyperlinks. However, the relationship between the primary web page and other web documents associated with the web page, such as press releases, blog posts and social media posts, is also optimized to provide a higher search ranking for the primary web page than would otherwise have been achieved through classic SEO initiatives alone. Accordingly, in a process of Web Presence Optimization ("WPO"), the wider presence of the web page within a network of interrelated and connected web documents is emphasized, and not just certain facets of the web page itself, to improve its performance in search engines.

According to Web Presence Optimization, a primary web page, which can be an enterprise web page, is associated with a number of frequently published subsidiary web documents, such as press releases, blog posts, social media posts, and the like. The primary web page and the subsidiary web documents are then interconnected using a networked set of cross-links between the subsidiary web documents and back-links to the primary web page, to create a sort of center of gravity around the primary web page. Additional outgoing links from the primary web page to other external web documents can also be provided. Moreover, the content of each subsidiary web document is coordinated with that of the primary web page by embedding the same keyword or keyword phrases in strategic locations throughout each associated document. Links to the associated web documents are also added to social media sites in order for the web documents to be widely distributed and shared between different users. Tracking historical search rank data relating to one or more different web documents over time, and correlating trends or features of resulting data graphs with specific web presence optimization initiatives or other external events also provides feedback and heightened insight into the overall efficacy of the web presence optimization effort.

Referring now to FIG. 1, there is illustrated a schematic representation of a computer system 10, in accordance with embodiments of the present invention, which can be used for optimizing a web page for search engines. The computer system 10 includes processor 20 coupled to storage device 25 and program memory 30. The processor 20 can be a dedicated processor, such as a central processing unit (CPU), a graphics processing unit (GPU), a Digital Signal Processor (DSP), a Field Programmable Gate Array (FPGA), an Application Specific Integrated Circuit (ASIC), or the like. Alternatively, the processor 20 can be any other processor included in a general purpose computer or workstation. The processor 20 can generally be any type of processor, which is configurable by an instruction set or sets stored in the storage device 25 to execute software programs in the program memory 30.

Storage device 25 is coupled to the data processor 20 and comprises a suitable non-transitory, computer-readable storage medium. For example, the storage device 25 can include both volatile and non-volatile storage media, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, optical media, and the like. The storage device 25 can be provided as an external storage device or database, such as a hard drive, compact disc ("CD"), digital video disc ("DVD"), memory card, memory stick, floppy disc, universal serial bus ("USB") memory device, or any other device configured to store data. Alternatively, the storage device 25 can be provided internal to the processor 20 or to the general purpose computer or workstation in which processor 20 is situated. One or more storage devices, such as storage device 25, may be coupled to the processor 20.

Instructions stored in the storage device 25 are executed by the processor and, upon execution, program the processor 20 to execute one or more software modules, as described herein, in the program memory 30 coupled to the processor 20. In some embodiments, the program memory 30 can comprise cache memory or other random access memory for dedicated use by the processor 20 to execute the software modules. The function of the software modules includes, but is not limited to, performing the steps of various methods, which are fully described herein below in accordance with aspects of embodiments of the invention, to optimize a web page for search engines. Thus, the various functions, acts or tasks performed by the processor 20 are independent of the nature and type of the program memory 20 and the storage device 25, as well as the nature and type of the instructions stored in the storage device 25, and the type of processor 20 or protocols implemented thereby. The functions, acts or tasks can also be performed by software, hardware, integrated circuits, firmware, micro-code and the like, operating alone or in combination. Multiprocessing, multitasking, parallel processing strategies and the like are also possible. Suitable configuration of the processor 20, storage device 25 and program memory 30 is within the understanding of the skilled person.

As seen in FIG. 1, the processor 20 is further coupled to display 35 and input device(s) 40. The display 35 can be any display unit configurable by the processor 20, such as a liquid crystal display (LCD), an organic light emitting diode (OLED), a flat panel display, a solid state display, a cathode ray tube (CRT), a projector, a printer, or the like. As will be described more fully below, the display 35 is used to display a user interface for software modules executed by the processor 20. Input device(s) 40 may be any suitable devices for inputting commands or other data to the processor 20 to be used in the software modules. For example, the input device(s) 40 can include a number pad, a keyboard, a cursor control device, such as a mouse, or a joystick, remote control, and the like. It is also possible for the display 35 to comprise a touch screen display, and thereby function itself also as an input device for the processor 20.

Communication subsystem 45 is also coupled to the processor 20 for making a connection with the network 50. The communication subsystem 45 may be integrally provided within the processor 20, but may also alternatively be implemented as a separate component coupled to the processor 20. Moreover, the communication subsystem 45 may be implemented using software, hardware or a combination thereof in different embodiments of the present invention. It will further be appreciated that network 50 may be any type of computer accessible network, including a personal area network (PAN), local area network (LAN), or wide area network (WAN), and may include wired networks, wireless networks, or combinations thereof. Moreover, the network 50 can be a public network, such as the Internet, as well as a private intranet or combinations thereof. Communication subsystem 45 can make both a wireless connection to the network 50, as well as a physical connection, such as a wired Ethernet connection, utilizing a suitable networking protocol such as TCP/IP, HTTP, FTP based networking protocols, and the like. Accordingly, the communication subsystem 45 allows the processor 20 to interface with other network components connected to the network 50, such as databases, data servers, web servers, and other network-connectable devices. The processor 20 is thereby capable of compiling data from network components it makes an interface with.

Figure 2:
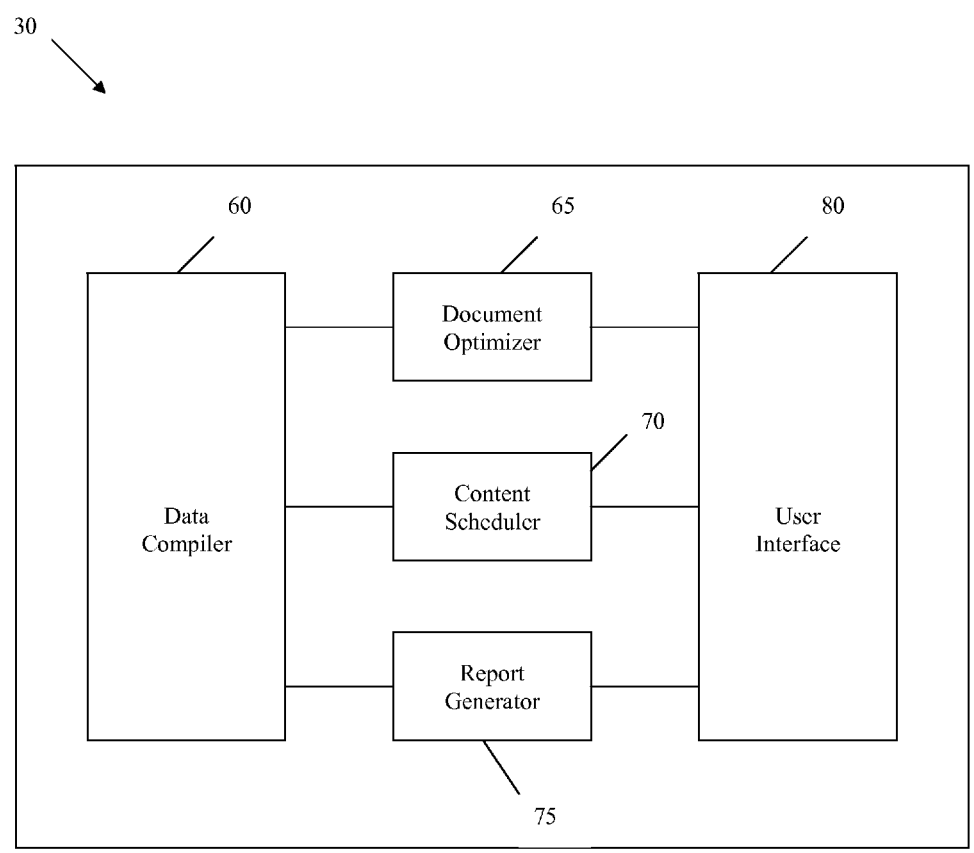
FIG. 2 is a schematic diagram illustrating software modules that can be executed by the system illustrated in FIG. 1 to optimize a web page for search engines.

Referring now to FIG. 2, there is illustrated a schematic diagram of a software program that can be executed by the system 10 for optimizing a web page for search engines. The software program is executed in program memory 30 by the data processor 20 processing instructions stored in the storage device 25. The executed software program can be provided as a standalone application within the system 10, but in some embodiments can also be provided as a plugin utility for an external software application being run in the system 10. Thus, the software program can be adapted using techniques that will be well understood for installation into the external application to be used therewith. The external application to which the plugin utility interfaces can be a web development application for designing, creating and publishing web pages or other web documents to the Internet. When used in conjunction with such a web development application, the plugin utility makes it possible, for example, to optimize web pages and other web documents for search engines as they are being developed in the application using the plugin utility.

In a broad sense, the organic search ranking of a web page for a particular search query can be improved by creating a large number of additional web documents around and pointing back to the primary web page, which have similar content to the primary web page and which are frequently updated as well as widely distributed. Each of the primary web page and the associated web documents can be individually optimized for the search query in terms of one or more parameters based upon web analytical data compiled for the search query. However, the web page and associated web documents can also be jointly optimized to improve the organic search ranking of the primary web page by coordinating the content of the associated web documents to align with the primary web page, and further by providing a dense network of links between the associated web documents and the primary web page. Wide distribution of the associated web documents can be achieved by publishing them to syndication entities and social media sites in particular. To provide greater insight and to assess the overall efficacy of the web presence optimization effort, historical search rank data can be correlated with specific events and reported to the user. The interconnection of software modules illustrated in FIG. 2 can be used to provide these results.

As seen in FIG. 2, each of a data compiler 60, document optimizer 65, content scheduler 70, report generator 75, and user interface 80 may be executed in the program memory 30. The data compiler 60 can operate in conjunction with the communication subsystem 45 to compile web analytical data from multiple different sources within the network 50. For example, as described more fully below, data compiler 60 can compile Internet search traffic data from one or more search engines or third part web analytical systems that generates search traffic or search rank data. Accordingly, the data collected by the data compiler 60 can include traffic levels from different search engines to different web pages for potentially different search queries. The search data may further include data relating to how different search engines index web pages and, in particular, whether or not particular keywords have been indexed. The data compiler 60 may also compile other data associated with web pages that have been indexed, such as its title, description, incoming and outgoing links, and URL. Optionally, the data compiler 60 may compile data pertaining to which keywords are included in the title, document tags and/or headers of a web page. As should be appreciated, the data compiler 60 is configurable to located and gather search traffic data that would provide an indication of the amount of search volume that different keywords or keyword phrases are generating. Generally it is desirable for web pages to have high search ranks for popular search queries.

In some embodiments, the data compiler can further compile different page-level data for a web page, for example including URL length, page size, keyword density, inclusion of animation interfaces or other blocker elements, inclusion of header tags, and the like. It will be appreciated that the type and quantity of data that may be compiled by the data compiler 60 can be unlimited.

By interfacing with the network 50 the data compiler 60 may further compile historical search rank data for a web page in respect of a particular search query. In other words, the data compiler 60 can track the ranking of the web page for the particular search query over time. Search rank data can be compiled not just for the primary web page, but also any web document associated with the primary web page and additional web documents not directly associated with the primary web page. One class of web documents that it may be desirable to track consists of other web documents having similar content to the primary web page, such as competitor web pages.

The data compiler 60 can also compile distribution data for a web page or web document, which in effect tracks how widely a document has been distributed on social media sites. This can include, for example, a measure of how many times or how frequently one of the web documents associated with the primary web page has been referenced in another web document on the social media site. Similarly, the distribution data can include a measure of how many times or how frequently one of the web associated documents has been re-posted to the social media site, or clicked-through from another web document on the social media site, or been included in a backlink referral or social bookmarking in the social media site, or been mentioned in the social media site. All of these different types of distribution data can be compiled by the data compiler 60 to provide an indication of a web document's distribution in the social media environment.

Document optimizer 65 is linked to the data compiled 60 and the user interface 80, and can process a web document to determine aspects or parameters of a web page or associated web document to modify for improving the organic search ranking of the web page. At a first level, the document optimizer 65 can perform an audit of the web page or associated web document to determine page level parameters to change. For example, the document optimizer 65 can examine document format and code structure, use of tags and headers, URL, document size, and the like to determine recommended modifications. At a second level, however, the document optimizer 65 can analyze the use of keywords and hyper-links in the web page or associated web document, in comparison to the web analytical data compiled by the data compiler 60, to determine recommended modifications to these document parameters as well.

Moreover, given the increasing emphasis that Internet search engines are placing on the frequency of content updates to determine search rankings, the document optimizer 65 can also optimize the relationship of a primary web page to other web documents associated with it. Thus, the document optimizer 65 can identify aspects or parameters of two associated web documents that do not match each other and then make recommendations to modify one of the documents to match the other. As an example, if two web documents have generally similar content but expressed using different keywords, it can be advantageous to modify one of the documents to use keywords that are consistent with the other. That way, the associated web document will have a higher perceived relevance in Internet search engines, thereby achieving higher search rankings as well. For any of the above cases, the document optimizer is linked to the user interface 80, in which the user can be prompted to make a recommended change to the target web document. Upon being prompted, the user can apply the recommended modification to the at least one parameter of the associated web document.

Content scheduler 70 is also functionally linked to the data compiler 60 and the user interface 80. Web analytical data compiled by the data compiler 60, such as search rank and distribution data is received by the content scheduler 70. Based upon the received data, the content scheduler 70 can then determine a recommended distribution schedule for distributing different web documents associated with the primary web page throughout various social media sites. The distribution schedule can be determined depending on many different factors to maintain the perceived relevance and currency of a web document, and for example can be determined relative to a corresponding distribution schedule for another high ranking web page taken as a benchmark target. In a similar fashion, the content scheduler 70 can also determine a release schedule for new web documents (again e.g. blog posts and press releases) associated with the primary web page, with the determination again being made based upon the web analytical data compiled by the data compiler 60. By releasing new web documents and then distributing links to these web documents to social media sites, with sufficient regularity, fresh content will continuously circulate and point to the relevance of the primary web page. The organic search ranking of the primary web page can be improved as a result.

Report generator 75 can be configured to process web analytical data together with logged event data in order to determine correlations between the two data sets. The web analytical data can include historical search rank data (i.e. ranking over time for a given search query) for a web page. In other words, the search ranking of the web page will be tracked for one or more selected search queries over time. Event data will also be logged in the data compiler 60 for events that may have had an impact (positive or adverse) on search ranking. The event data can refer to internal events that occur as a direct result of a WPO initiative, i.e. making recommended modifications to the primary web page or associated web documents, releasing and distributing new associated web documents, and the like, as these events could all potentially impact the search ranking of the primary web page. However, the event data logged in the data compiler 60 is not limited just to internal data and can include external event data as well. One example of an external event that could be logged is a change to a competitor web page that had a positive affect on its search ranking for a search query that the primary web site would desirably have a high ranking for as well. Another possibility is a change in the respective ranking algorithms used in the search engines to rank search results, as these events also could potentially impact the search rank of the primary web page.

The report generator 75 is configured to generate at least one data graph of historical search rank data for the primary web page, and then determine a causal correlation between features or trends in the data graph and events in the event log, in the sense that a particular event or sequences of events is determined to have caused in some part the observed trend or feature in the graph. To accomplish this task, the event log can include timing data for each of the logged events. It can then be determined whether an event that occurred in the timeframe of an observed feature or trend of the graph could explain the feature or trend. For example, possible features of the data graph that might be correlated with specific events could include local minima or maxima (indicating a reversal in the search rank trend), unusually large jumps or drops in search rank, steady increases or decreases in search rank, and so forth. Events occurring in the timeframe of the observed feature or trend can be put forth as having bearing a causal relation to the trend. Data graphs generated by the report generator 75 can be displayed in the user interface 80. Of course, it should be appreciated that the report generator 80 need not be limited to generating data graphs, and can also generate other data forms, such as tables and charts, which equivalently bring attention to possible correlations between trends in historical search rank for display in the user interface 80.

Figure 3:
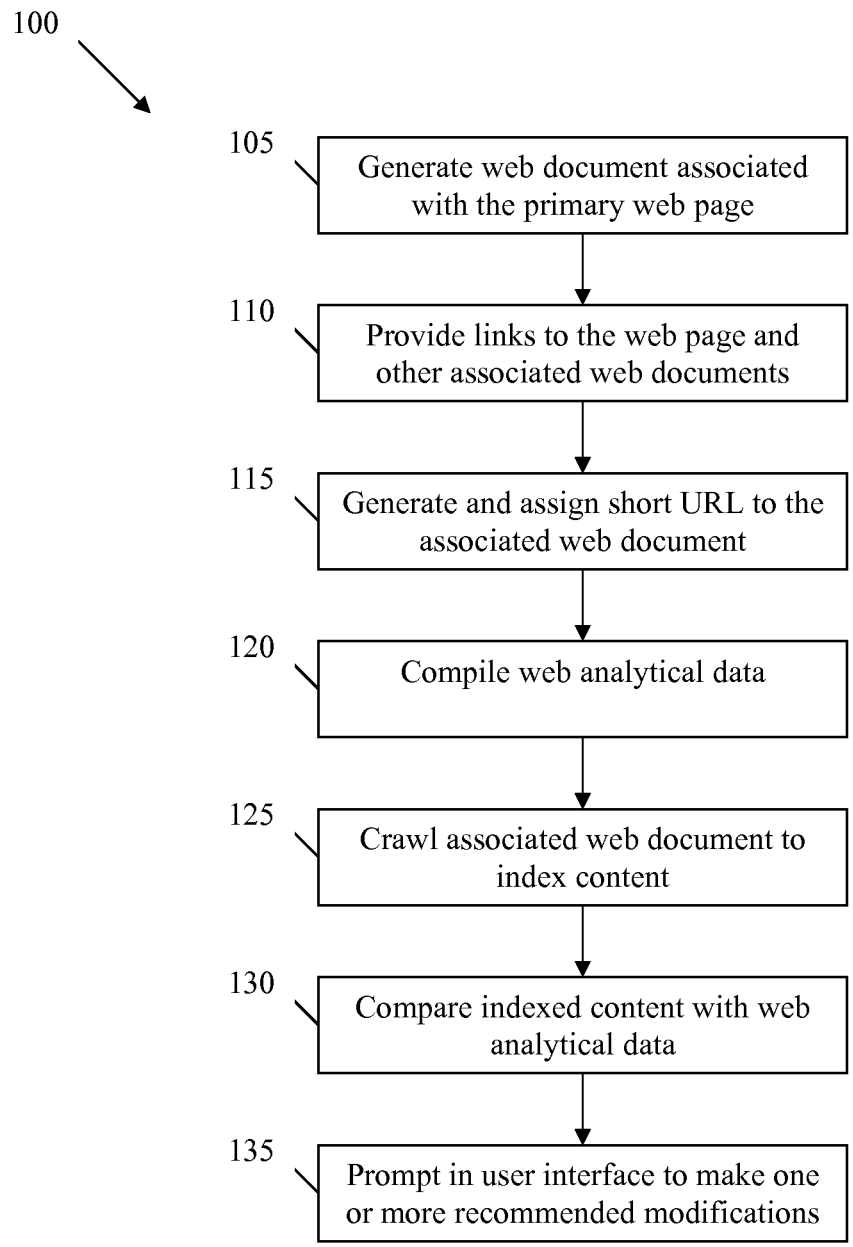
FIG. 3 is a flow chart illustrating the steps of a method performed by the system illustrated in FIG. 1 for generating a web document associated with a primary web page to optimize an organic search ranking of the web page.

Referring now to FIG. 3, there is provided a flow chart illustrating the steps of a method 100, in accordance with aspects of embodiments of the present invention, for generating a web document associated with a web page in order to optimize the web page for search engines. The method 100 can be performed, for example, by the processor 20 in the program memory 30 in conjunction with other system components where appropriate. However, it should be understood that the specific steps illustrated in FIG. 3 are exemplary only and need not necessarily be performed in the order shown. Other additional steps herein described but not specifically shown may be included in the method 100, just as some of the steps specifically shown may also be omitted without departing from the scope of the present disclosure. The method 100 may also, of course, be performed repeatedly to generate multiple web documents associated with the primary web page, as described herein.

At step 105, a web document associated with the primary web page is generated. The associated web document can be a blog post containing, for example, editorial content that is related to the subject matter of the primary web page. Similarly, the associated web document can also be a press release containing a news item or other current information that may relate somehow to the primary web page. The blog post or press release can be published as a separate web document distinct from the primary web page. But in some embodiments, the blog post or press release can be published in a section or sub-page of the primary web page. Of course, this listing of the different possible types of web documents is not intended to be limiting. The associated web document may in other instances also be a posting to a social media site or the like.

At step 110, at least one linking structure, which could be a hyperlink, is provided between the primary web page and the associated web document. As will be appreciated, the linking structure can be provided in the form of a hyperlink embedded into the text or graphics of the associated web document. The hyper-link may be a cross-link to other web documents associated with the primary web page, but may also be a back-link from the associated web document to the primary web page. If desired, and in some embodiments advantageously, different back-links and cross-links from different associated web documents can point to different sections or locations within the target documents based upon the immediate context of the embedded hyper-link. By thus providing cross-links and back-links to other associated web documents and the primary web page, respectively, a dense network of inter-linked web documents will evolve and be centered on the primary web page. This network of cross-links and back-links to and from other web documents can positively influence the search ranking of the primary web page on which the associated web documents are centered.

At step 115, a short URL is generated and then assigned to the associated web document. Some web documents when they are first created are assigned extremely long and unintuitive URLs, often consisting of long random or pseudo-random character sequences. Aside from the fact that these URLs may be practically impossible to remember and just generally difficult to work with overall, their extreme length is actually incompatible for certain uses and applications. For example, some search engines will perform keyword analysis on an initial character block of the URL only, i.e. only the first characters up to a maximum limit. Thus, if the URL of a web document is automatically generated to include random character strings or to contain more than the maximum allowed number of characters, then it may not be optimal for search engines. By creating a short URL for the associated web document, however, keywords can be included within the first part of the URL and thereby be visible to the search engines.

As another example, some social media sites impose a hard character limit on the number of characters each posting to the social media site may contain. That limit can be as low as 140 characters, which some of the automatically generated URLs containing random character strings may in fact approach or even exceed. By creating a short URL for the web documents associated with the web page, it is possible to restrict the short URL to a character count that will be acceptable for posting to the social media site. Thus, the newly created and optimized short URL can then be distributed to other Internet users by posting to different social media sites. This too can have a positive effect on the search ranking of the primary web page with which the additional web documents are associated.

In step 120, web analytical data that will be used to optimize one or more parameters of the associated web document is compiled. The compiled web analytical data can include search analytical data, such as search engine statistics, search volume trends and related analyses, reverse searching (e.g. entering web pages to identify their keywords), keyword monitoring, search result and advertisement history, advertisement spending statistics, web page comparisons, affiliate marketing statistics, multivariate ad testing, and the like. As will be understood, the search analytical data can be compiled in different possible ways. As one example, many search engines will in fact provide access to their own data using third party services, such as Google Trends and Google Insights, which in turn collect data from internet source providers (ISP), scraping search engines, and various other means.

Collecting Internet traffic statistics from ISPs can provide for broader reporting of web traffic as compared to simple keyword monitoring or reverse searching. For example, the compiled search analytical data can be processed in order to discern overall Internet search trends like which keywords Internet users tend to be including in their search queries for a given topic. Other search trends than can be extracted from the compiled data can include such things as frequency of keyword use, click-through rates for given key words, average time spent at a target web page in a list of search results, and the like.

In step 125, the associated web document is crawled in order to index its content. In other words, the associated web document is analyzed in order to determine the general nature of its content as represented by one or more identified key words. In crawling the associated web document, locations in which identifiable key words appear can also be noted, as well as locations in which no identifiable key words appear. Then in step 130, the indexed content is analyzed based on the compiled web analytical data in order to determine parameters or aspects of the associated web document that could be modified to improve the search ranking of the primary web page. As one example, the keywords identified in the indexed content can be compared with the search analytical data as a basis for recommending changes to the content and/or structure of the associated web document.

In step 135, based upon the comparison of the indexed content with the search analytical data, a user can be prompted to make a recommended modification to one or more parameters of the associated web document in order to improve the organic search ranking of the primary web page. For example, the recommended modification can be to include one or more keywords or keyword phrases in the associated web document. The keywords or keyword phrases to include can be determined based upon the web analytical data and the indexed content of the associated web document, as well as indexed content from the primary web page with which the web document is associated, such that more effective use of keywords is made. In particular, the recommendation can be to substitute popular and frequently used keywords or keyword phrases that are relevant to the content of the associated web document for corresponding less popular keywords that are currently being used. This way the web documents will be optimized for keywords that are actually being searched. Of course, the popularity of keywords can also change over time, as reflected in the web analytical data, and thus the recommendation can also be to change one or more existing keywords.

Certain locations throughout web documents, as it will be appreciated, are given more emphasis than other locations for inclusion of keywords or keyword phrases. Thus, the recommended modification can be to include a selected keyword or keyword phrase in a specific location in the associated web document, such as the document title or one or more section headings within the document. The recommended modification can also be to include the selected keyword or keyword phrase in one or more data tags included in the structure or architecture of the web document. This can be the case where the web document is published in HyperText Markup Language (HTML) or Extensible Markup Language (XML), for example. The recommended modification can also be to include the selected keyword or keyword phrase in one or more of the linking structures included in the associated web document. This can be the case where selected keyword relates to a specific topic or item and the link is directed to another web document providing more detailed information on the topic. Thus, the recommended modification can also be to include the selected keyword or keyword phrase in multiple different locations through the associated web document.

The recommended modification can also relate to parameters of the associated web document other than keywords. For example, search engines in some instances will also only index a maximum number of initial characters in a document title, which implies that only keywords located within the maximum character limit will be discovered by the search engines. Thus, the recommended modification can be to restrict the length of the document title to fall within the maximum character limit, which can be about 75 characters or so. In the same way, the recommended modification can be to include at least one keyword or keyword phrase within the first 75 characters of the document title. In a similar way, the recommend modification can be to include or alter document headings within the body of the web document, and also to include or alter one or more data tags within the code structure of the web document.

Moreover, some web document formats are more search-engine friendly, and thus more susceptible to indexing by the search engine, than others. Animation interfaces, like Adobe Flash, are one well known example of a web document format that is not indexed very efficiently by Internet search engines. Thus, the recommended modification can be to remove any animation interfaces that may have been included in the associated web document, and to regenerate the web document using an alternative document format, such as a suitable markup language that will increase the visibility of the web document to the search engines. Other modifications to the document code structure and removal of blocker elements (i.e. aspects of the web document format that block indexing by the search engines) can be recommended as well.

As described above, the associated web document is generated including one or more linking structures to the web page or to other web documents associated with the web page. Nonetheless, based upon the compiled web analytical data, the recommended modification can be to include one or more additional linking structures, for example where it is determined that additional linking structures are required to bring the web page into line with average Internet trends. Thus, the recommended at least one additional linking structure can point to the primary web page, or to other of the web documents associated with the web page. However, in some embodiments, the linking structure can point to another location within the associated web document. The linking structure can also even point to other web documents having similar content to the primary web page or to a relevant reference article. The recommended modification can also be to include keywords or keyword phrases in the linking structure.

It should be appreciated that certain steps 120 to 135 are, with suitable modification, applicable to the primary web page directly in order to improve its organic search ranking. For example, by compiling web analytical data in step 120 and crawling the primary web page to index content in step 125, a comparison can be made between the index content and the web analytical data in step 130 in order to identify one or more parameters of the primary web page for recommended modification. Essentially the same set of parameters can be identified in the primary web page as can be identified in the associated web documents and will therefore not be listed again here for clarity and brevity.

Figure 4:
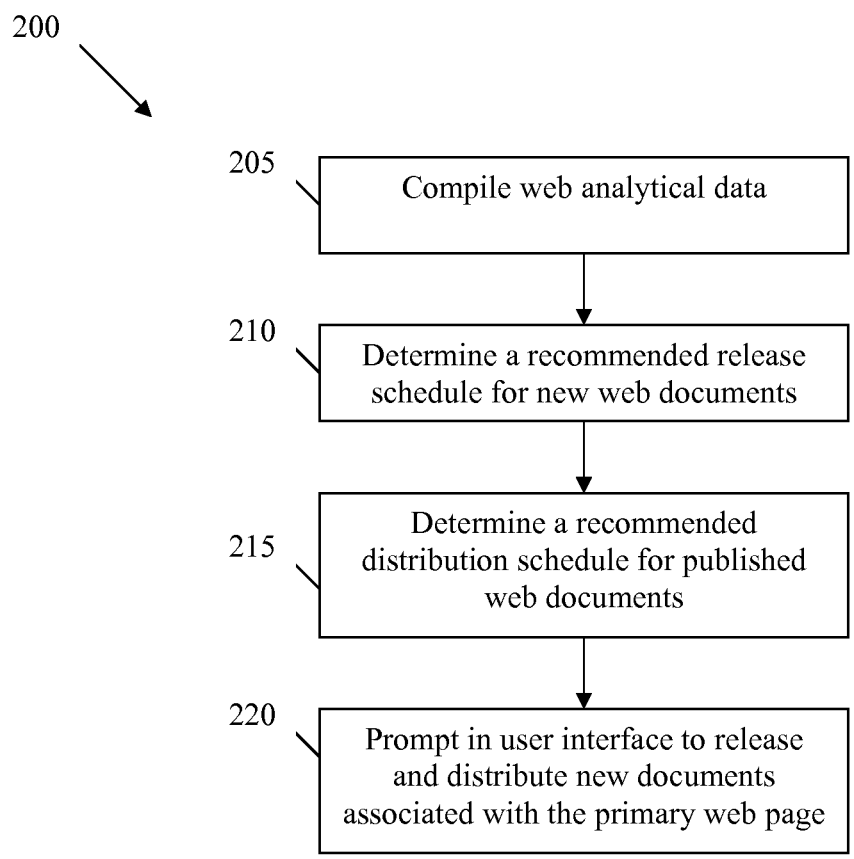
FIG. 4 is a flow chart illustrating the steps of a method performed by the system illustrated in FIG. 1 for determining release and distribution schedules for web documents associated with the web page.

Referring now to FIG. 4, there is provided a flow chart illustrating the steps of a method 200 for determining for determining release and distribution schedules for web documents associated with a primary web page. The method commences at step 205, which comprises compiling web analytical data, including distribution data for one or more web documents associated with a primary web page. As step 205 is substantially the same as step 120 in method 100, it will not be discussed again in any great detail.

In step 210, a recommended release schedule for new web documents associated with the primary web page is determined based upon the web analytical data. The recommended release schedule can comprise both a recommended number of documents to release and a recommended release frequency for the documents. The recommended number and frequency can be dependent on average trends determined after processing of the compiled distribution data. In other words, in order to have a positive impact on the search ranking of the primary web page, it can be determined to release new associated web documents at a frequency at least equal to an average release frequency or, more generally, having any selected relation to the average release frequency. Alternatively, the recommended release frequency can be determined with relation to the release frequency of another, separate high ranking web page, taken as a form of benchmark number to match or, in some cases, exceed.

In step 215, similar to step 210, a recommended distribution schedule for existing web documents associated with the primary web page is determined based upon the web analytical data. The recommended distribution schedule can include the recommended number and frequency of times that the published web documents (e.g. blogs or press releases) will be distributed to social media sites. Distributing a web document to a social media site, it is recalled, can involve generating a short URL for the web document and then posting the short URL to the social media site. Again the recommended number and frequency of distributions can be determined with reference to a high ranking web page for the same search query and be determined to ensure also a high ranking of the target web page, or in the very least to improve the search ranking of the web page for that search term.

In step 220, the user can be prompted in a user interface to generate new web documents associated with the primary web page, and subsequently distribute the web documents to social media sites, at the recommended release and distribution schedules. These efforts, as will be described below, can then be correlated with trends (either positive or negative) in the search ranking of the web page for the particular search query.

Figure 5:
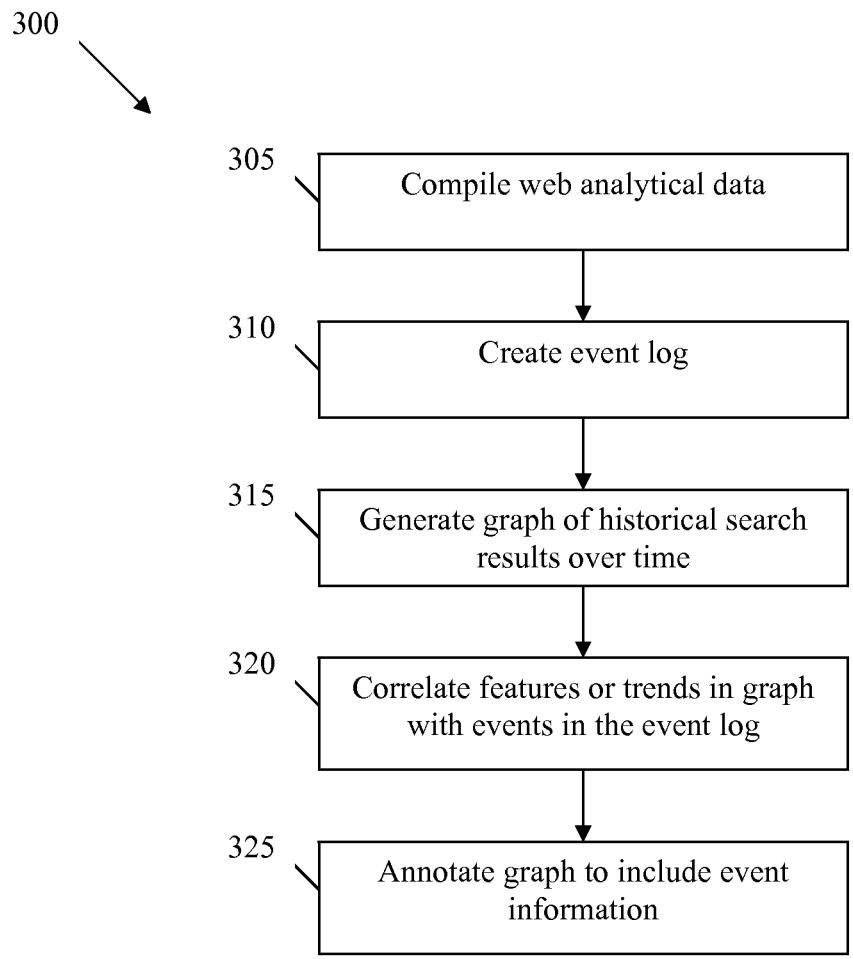
FIG. 5 is a flow chart illustrating the steps of a method performed by the system illustrated in FIG. 1 for generating an annotated graph of historical search rank data for one or more different web documents.

Referring now to FIG. 5, there is provided a flow chart illustrating the steps of a method 300 for generating an annotated graph of historical search rank data for a web page. The method 500 commences at step 305, which comprises compiling web analytical data, including historical search rank data for one or more web documents associated with a primary web page. As step 305 is substantially the same as step 120 in method 100 and step 205 in method 200, it will not be discussed again in any great detail.

In step 310, an event log is created. The event log can comprise a list of events together with certain event data, such as timing information for the event. In other words, the event log can include a tinning sequence for a list of identified events. The events can refer to different initiatives taken to improve the organic search ranking of the primary web page, including but not limited to, modifications to a parameter of the web page or a web document associated with the web page, release and distribution of new web documents associated with the web page, and other global tasks performed to the web page or associated web documents. The event log can also include event data for additional external events, such as the timing of changes made to the ranking algorithms employed by the various search engines, changes to competitor web sites, and the like. In other words, the event log can compile a list of all events that may have had an impact, whether positive or adverse, to the search ranking of the primary website or an associated web document.

In step 315, a graph of historical search rank data for one or more web documents is created. The graph can include trend curves for any or all of the primary web page, associated web documents, and other non-associated web pages or documents, such as competitor web pages. For example, the trend curves can represent the search ranking for a particular search query. It will be understood as well that that multiple trend curves could thus be created corresponding to different search queries that the user may wish to track.

In step 320, trends or features in the graph of historical search results are identified and then correlated with events in the event log. For example, upward trends in the historical search rank of a website (indicating an improved search rank), which occur around the time of modifications to the primary web page or associated web documents, can be correlated in the sense that the modification is identified as being a possible cause for the upward trend. Similarly an upward trend in the graph can be correlated with the release and distribution of a new press release or blog associated with and linked back to the main web page being tracked. At the same time, negative trends in the historical search rank can also be correlated with, for example, the absence of new releases. The negative trend could also be correlated with changes or modifications to a competitor web page that results in a corresponding upward trend in that web page's search rank. External data, such as changes to the ranking algorithms implemented in the search engines can also be correlated, depending on the case, with either upward or downward trends in the graph. Thus, the trends or features in the graphs can be correlated with certain identified event data and, more specifically, the timing and projected impact of those events on search rank.

In step 325, once trends or features of the graph have been correlated with specific events, the graph can be annotated to include the correlated event data. By including the annotations in the graph, more insight into how a web page's search rank can be affected will be obtained. The annotations can be included in the graph at or near the correlated trend or feature in order to reinforce the correlation, but this need not be the case. It will be appreciated that many different annotation strategies will be possible. The graph once annotated can be presented in the user interface 80, for example.

The present invention has been described here by way of example only. Various modification and variations may be made to these exemplary embodiments without departing from the spirit and scope of the invention, which is limited only by the appended claims.

We claim:

1. A method of optimizing a web page for a search engine, the method comprising:

generating an event log comprising one or more events representing one or more initiatives affecting an organic search ranking of the web page for a search query performed in the search engine;

generating at least one data graph of historical search rank data including the organic search ranking of the web page for the search query over time;

identifying a feature or trend in the at least one data graph;

automatically correlating, using a processor, the event data with the feature or trend identified in the at least one data graph to automatically identify the one or more events causing the feature or trend in the at least one data graph;

determining, using the processor, a recommended modification to at least one parameter of a web document associated with the web page, the recommended modification to improve the organic search ranking of the web page, the determination made based on the correlation; and prompting, in a user interface, the recommended modification.

2. The method of claim 1, wherein the associated web document comprises at least one of a press release, a blog post, and a social media post.

3. The method of claim 1, wherein the at least one parameter of the associated web document comprises any one of: title content, title length, keyword content, keyword location, document code structure, document format, document content, document headings, document tags, document meta content, blocker elements, web document indicator (i.e. URL), linking structures, and tracking codes.

4. The method of claim 3, wherein the recommended modification comprises at least one of:
 modifying the associated web document content to include at least one keyword;
 modifying the associated web document content to include at least one keyword phrase;
 restricting the title length of the associated web document to a specified character limit;
 incorporating at least one linking structure in the associated web document;
 generating a short URL for the associated web document;
 changing the document code structure or removing one or more blocker elements from the associated web document;
 including one or more data tags or document headings in the associated web document;
 altering one or more data tags or document headings in the associated web document.

5. The method of claim 4, wherein the recommended modification comprises recommending including the at least one keyword in one or more of the web document title, one or more data tags of the associated web document, one or more headings included in the associated web document, and one or more linking structures in the associated web document.

6. The method of claim 5, wherein the recommended modification comprises including the at least one selected keyword in multiple locations throughout the associated web document.

7. The method of claim 5, wherein the recommended modification comprises including the at least one selected keyword in a specific position within the associated web document.

8. The method of claim 4, wherein the at least one linking structure provides a link from the associated web document to one or more of the web page, another location in the associated web document, other web documents associated with the web page, and other web documents having content similar to the web page.

9. The method of claim 1, further comprising:
 compiling distribution data for the associated web document; and
 determining the recommended modification based on the distribution data.

10. The method of claim 9, wherein the distribution data relates to one or more of: a number or frequency of references to the associated web document in other web documents, a number or frequency of re-postings of the associated web document in other web documents, a number or frequency of click-throughs to the associated web document from other web documents, a number or frequency of backlink referrals, a number or frequency of social bookmarks of the associated web document, a number or frequency of social sharing mentions of the associated web document, and a number or frequency of sales conversions.

11. The method of claim 1, further comprising:
 compiling search rank data for the web page; and
 determining the recommended modification based on the search rank data.

12. The method of claim 11, wherein the search rank data comprises a present or historical search ranking for the search query of at least one of the web page, the associated web document, and other web documents associated with competitors of the web page.

13. The method of claim 1, wherein the event data comprises timing data for at least one of a modification to the at least one parameter of the associated web document, timing data for publication of new web documents associated with the web page, timing data for social bookmarking of the associated web document, and timing data for social sharing mentions of the associated web document.

14. The method of claim 1, wherein the event data comprises timing data for an alteration to a respective search rank algorithm used in one or more of the search engines.

15. The method of claim 1, further comprising:
 determining, using the processor, a recommended release schedule for publishing new web documents associated with the web page, the determination made based upon the correlation; and
 publishing a number of the new web documents according to the recommended release schedule.

16. The method of claim 15, further comprising:
 determining, using the processor, a recommended distribution schedule for distributing links to published web documents associated with the web page to social media sites, the determination made based upon the correlation; and
 distributing the links to the published web documents according to the recommended distribution schedule.

17. The method of claim 1, further comprising presenting the user interface as a plug-in for a web development application.

18. The method of claim 1, further comprising applying the recommended modification to the at least one parameter of the associated web document in the user interface.

19. The method of claim 1 wherein the at least one data graph of historical search rank data comprises:
 a first data graph including the organic search ranking of the web page for the search query performed in the search engine over time; and
 a second data graph including a second organic search ranking of the web page for a search query performed in a second search engine.

20. A system for optimizing a web page for a search engine, the system comprising:
 a storage medium storing executable instructions;
 a processor coupled to the storage medium, the processor programmed by the instructions to:
  generate an event log comprising one or more events representing one or more initiatives affecting an organic search ranking of the web page for a search query performed in the search engine;
  generate at least one data graph of historical search rank data including the organic search ranking of the web page for the search query over time;
  identify a feature or trend in the at least one data graph;
  automatically correlate the event data with the feature or trend identified in the at least one data graph to automatically identify the one or more events causing the feature or trend in the at least one data graph;
  determine a recommended modification to at least one parameter of a web document associated with the web page, the recommended modification to improve the organic search ranking of the web page, the determination made based on the correlation; and prompt, in a user interface, to apply the recommended modification to the at least one parameter of the associated web document.

21. A non-transitory, computer-readable storage medium storing instructions executable by a processor coupled to the storage medium, the instructions for programming the processor to:

generate an event log comprising one or more events representing one or more initiatives affecting an organic search ranking of a web page for a search query performed in a search engines;

generate at least one data graph of historical search rank data including the organic search ranking of the web page for the search query over time;

identify a feature or trend in the at least one data graph;

automatically correlate the event data with the feature or trend identified in the at least one data graph to automatically identify the one or more events causing the feature or trend in the at least one data graph;

determine a recommended modification to at least one parameter of a web document associated with the web page, the recommended modification to improve the organic search ranking of the web page, the determination made based on the correlation; and prompt, in a user interface, to apply the recommended modification to the at least one parameter of the associated web document.

22. A method of optimizing a web page for a search engine, the method comprising:

generating an event log comprising one or more events representing one or more initiatives affecting an organic search ranking of the web page for a search query performed in the search engine;

generating at least one data graph of historical search rank data including the organic search ranking of the web page for the search query over time;

identifying a feature or trend in the at least one data graph;

automatically correlating, using a processor, the event data with the feature or trend identified in the at least one data graph to automatically identify the one or more events causing the feature or trend in the at least one data graph;

determining, using the processor, a recommended modification to at least one parameter of the web page, the recommended modification to improve the organic search ranking of the web page, the determination made based on the correlation; and prompting, in a user interface, the recommended modification.

* * * * *